United States Patent Office 2,884,850
Patented May 5, 1959

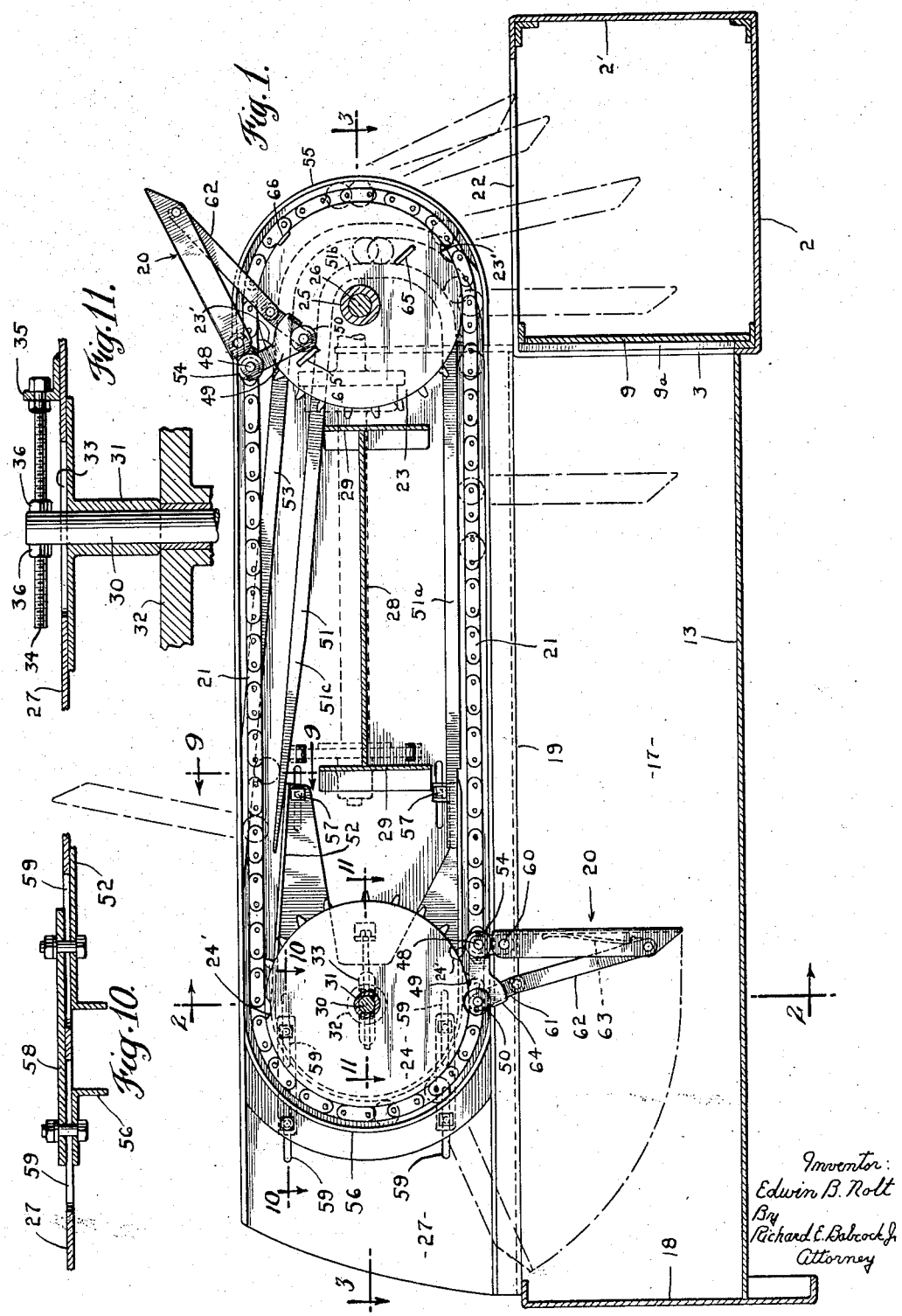

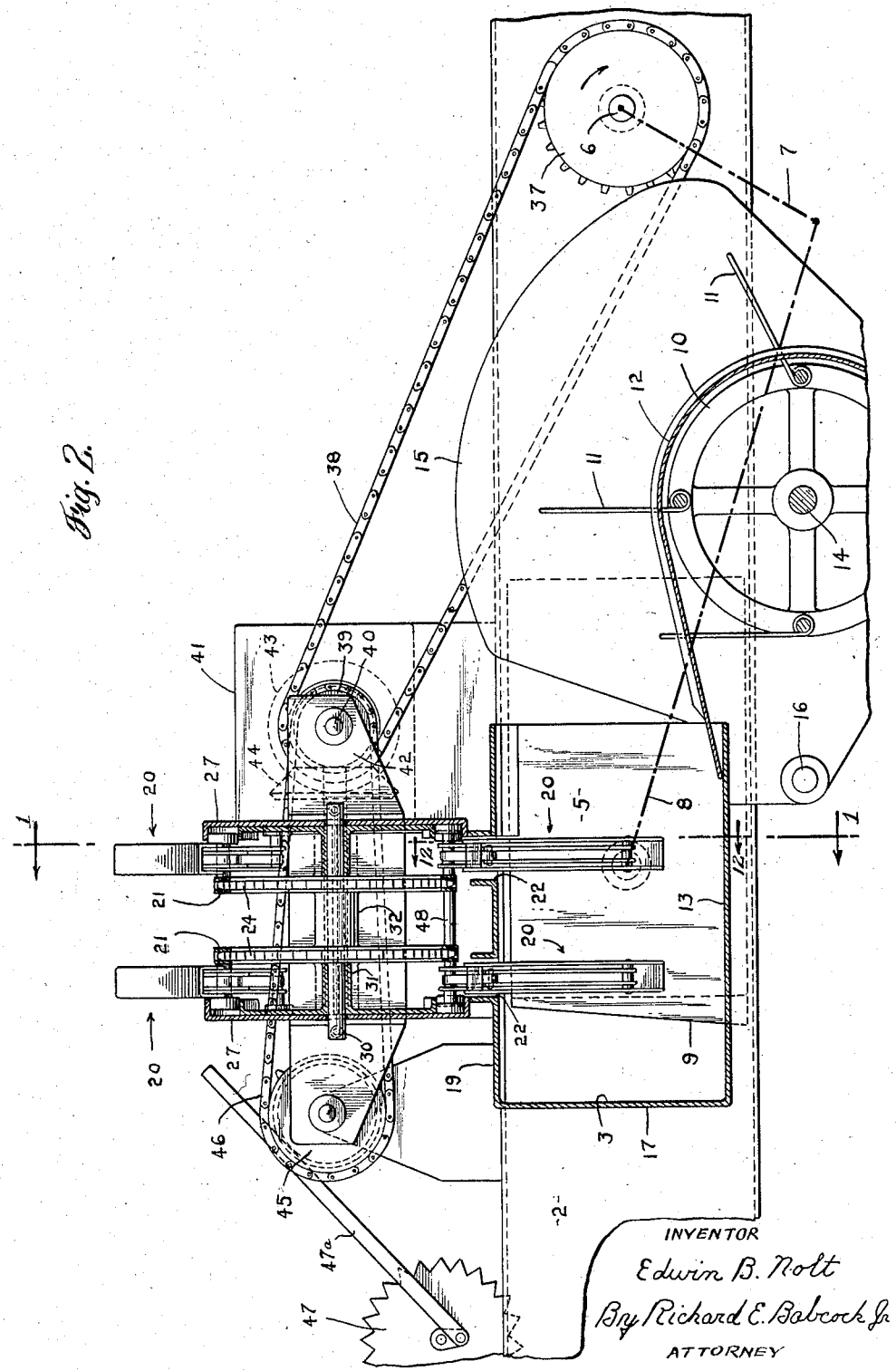

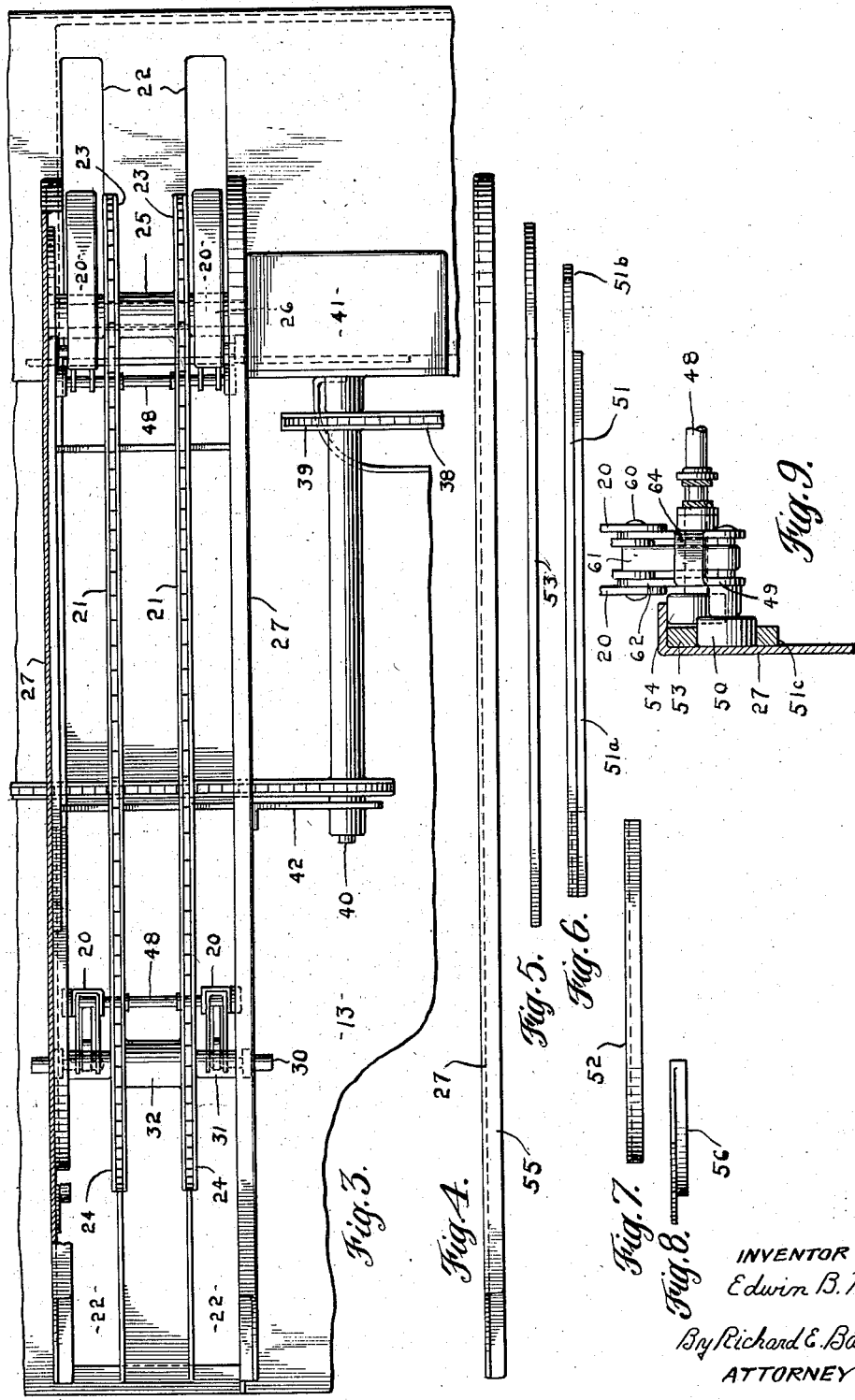

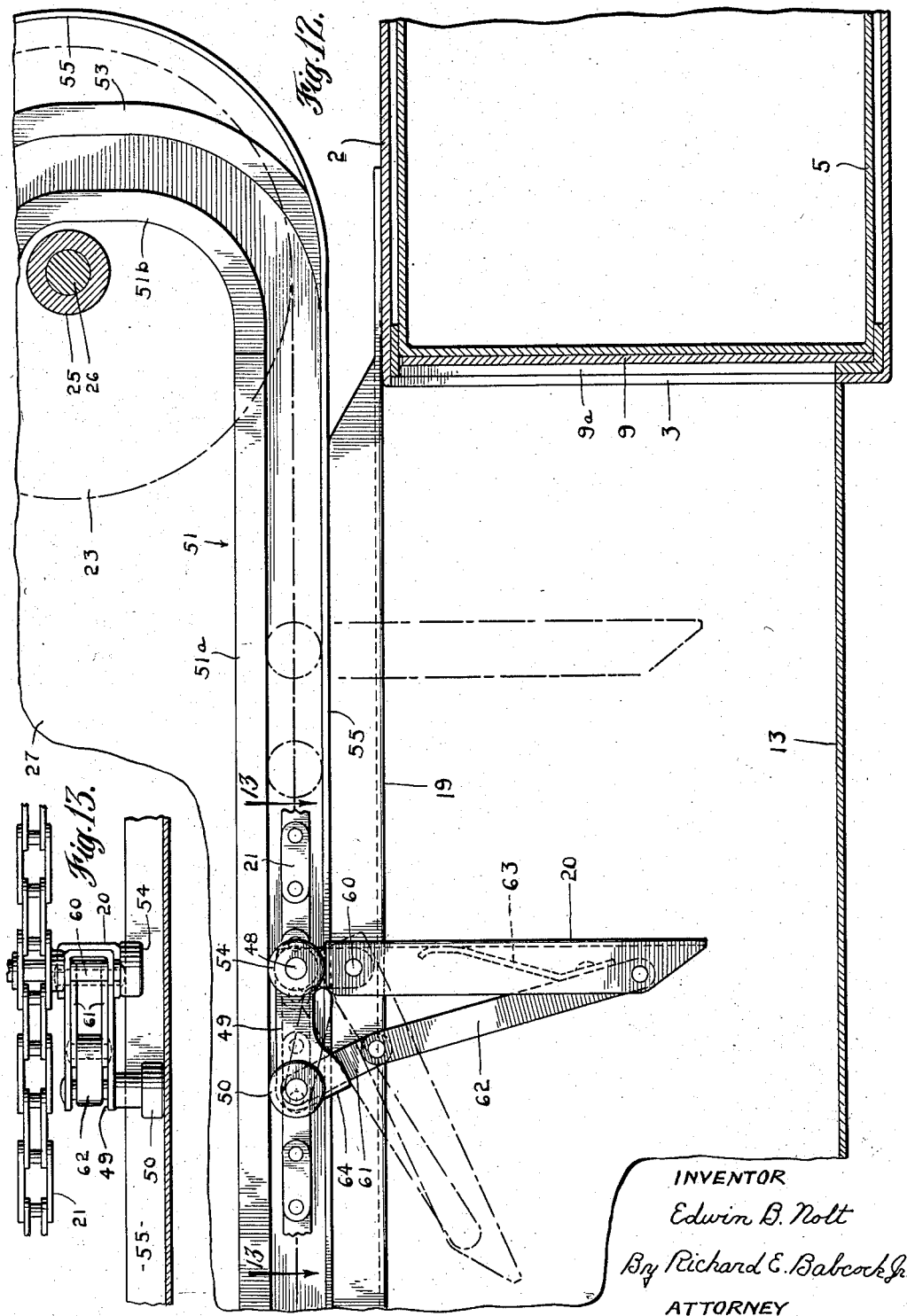

2,884,850

HAY BALER INFEED MECHANISM

Edwin B. Nolt, New Holland, Pa.

Continuation of application Serial No. 345,773, March 31, 1953. This application August 13, 1956, Serial No. 603,775

3 Claims. (Cl. 100—142)

This application is a continuation of my pending patent application Serial No. 345,773, filed March 31, 1953, now abandoned. The invention relates to an automatic pick-up hay baler of the type in which hay is delivered into the bale chamber through an opening in the side thereof by means entering the bale chamber in timed relation to the bale plunger. More particularly the invention relates to an improved infeed mechanism for a hay baler of this type.

A special problem arises in the feeding of hay into such side feed balers is that difficulty is encountered in properly distributing the hay across the bale chamber so that the far side of each bale and in particular the upper corner of such far side will be properly filled out. In overcoming this, prior patentees have employed feed elements which entered the bale chamber through the feed opening in timed relation to the plunger movement to distribute the hay across the bale chamber.

Some such prior art devices have required a supplementary continuously feeding cross-conveyer such as an auger to take the hay from the pick-up mechanism and deliver it to the said feed element, and have, therefore, been unduly complicated and expensive. Others have employed a single feed element for taking the hay directly from the pick-up mechanism and moving with it into the bale chamber, but in so doing have utilized feed elements which for various reasons could accomplish only intermittent delivery from the pick-up to the bale chamber with resultant inefficiency.

It is, therefore, an object of my invention to provide a baler side infeed mechanism which utilizes but a single continuously feeding cross-feed mechanism for taking hay directly from the pick-up and moving with it into the bale chamber in timed relation to the plunger movement.

In accordance with my invention, the pick-up delivers hay onto a horizontal feed table or platform which extends transversely from the bale feed opening in the side of the bale chamber. An endless carrier driven in timed relation to the movement of the bale plunger is guided in a circuit the operative portion of which moves horizontally over the feed table to a location over the bale chamber thence upwardly. This carrier supports feed members which are located to enter the bale chamber through the side thereof and be withdrawn upwardly through the top thereof, all while the plunger is retracted. Preferably a plurality of feed fingers or members are carried at relatively spaced locations along the endless carrier so that one such feed member or set of feed members is moving through the operative portion of the circuit at all times to thus maintain a continuous flow of hay across the feed table from the pick-up to the bale chamber.

A further important object of the invention is to provide a novel form of yielding feed element which exerts a continuously decreasing resistance to its yielding movement as the latter increases, and which after once encountering an obstruction sufficient to institute its yielding action will require but a minimum force to cause continued yielding so that it may ride over such obstruction without damage and with decreased likelihood of sweeping such obstruction or object into the bale chamber.

A further object is to provide a new control system for normally positively maintaining the feed members in substantially vertical positions as they move over the feed table and for at least part of their movement through the bale chamber whereby said feed members may efficiently compact hay against the far wall of the bale chamber and may efficiently free themselves of hay as they are withdrawn upwardly in a generally lengthwise or endwise direction from the bale chamber.

A still further object is to so dispose the guide rails that control the positioning of the feed members that adjustment of the sprockets necessary to take up slack in the carrier chains will not disturb the relationship between the said rails and the parts with which they cooperate. Further incidental objects and advantages will be apparent from the following detailed description considered in conjunction with the accompanying drawings in which:

Fig. 1 represents a cross-section through a baler incorporating the infeed mechanism of the invention, this view being taken on the line 1—1 of Fig. 2 looking in the direction of the arrows;

Fig. 2, a view partly in elevation and partly in section along the line 2—2 of Fig. 1;

Fig. 3, a plan section taken on the line 3—3 of Fig. 1 looking in the direction of the arrows;

Fig. 4, a plan view of one of the side plates between which the feed mechanism of the invention is supported;

Figs. 5, 6, 7 and 8, respectively, represent plan views of the several guide rails in exploded relation to each other and to the side plate of Fig. 4;

Fig. 9, a fragmentary section on the line 9—9 of Fig. 1 looking in the direction of the arrows;

Fig. 10, a fragmentary section on the line 10—10 of Fig. 1 looking in the direction of the arrows;

Fig. 11, an enlarged fragmentary section on the line 11—11 of Fig. 1 looking in the direction of the arrows;

Fig. 12, an enlarged section on the line 12—12 of Fig. 2 looking in the direction of the arrows; and, Fig. 13, a detail sectional view on the same scale as Fig. 12 taken on the line 13—13 of Fig. 12 looking in the direction of the arrows.

Referring now in detail to the accompanying drawings, I have shown my invention as embodied in a usual automatic pick-up hay baler which comprises a bale chamber 2 of hollow rectangular cross-section having a feed opening 3 through one vertical side wall thereof. Reciprocating longitudinally within the bale casing 2 is a usual bale plunger 5 which is driven from a rotating shaft 6 by means of a crank arm 7 and pitman 8, both illustrated diagrammatically in Fig. 2. The plunger 5 reciprocates past the feed opening and, as is well understood in the art, compresses hay which is fed into the bale chamber through the feed 3 during retraction of the plunger. For the purpose of separating the successive charges of hay into separate wads, a knife 9 carried at the forward end of the plunger may cooperate in usual manner with a knife 9a (Fig. 12) supported at the rear edge of the feed opening within the bale chamber.

It will be understood that the baler shown is of the wheel supported portable type adapted to be drawn by a tractor along a windrow of hay (to the right as seen in Fig. 2) and to automatically pick up such hay and feed it into the bale casing.

To this end, the baler carries a usual type of pick-up mechanism including a rotary reel 10 having tines 11 movable between stripper plates 12 to pick up hay from the ground and deliver it rearwardly over tangential extensions of said stripper plates 12 onto a horizontal feed table or platform 13. The pick-up reel may be supported on a drive shaft 14 journaled between side plates 15 (only one of which is shown) which are floatingly mounted for vertical movement about the axis of their pivotal connection 16 to the main baler frame, all as clearly disclosed in my aforesaid application.

The feed table 13 extends transversely outwardly in a horizontal plane from the lower edge of the feed opening 3 of the bale casing so that hay delivered onto the feed table by the pick-up 10 may be fed along over said table transversely to the bale casing and into the feed opening 3. Preferably the hay is confined against lateral escape from the feed table 13 by upstanding rear and end walls 17 and 18, respectively, and is prevented from piling up and overflowing said walls by a cover plate 19 supported on said walls in spaced relation above the table 13.

One or more feed fingers or members 20 supported on a constantly moving endless carrier 21—21 are movable laterally through slots 22 in the cover 19 in sweeping relation over the table 13 toward and into the bale feed opening 3 and into the bale casing, to then be withdrawn upwardly through the slots 22 which continue part way across the top of the bale casing.

The endless carrier in the present instance comprises a pair of laterally spaced sprocket chains 21—21, respectively, guided around the inner and outer pairs 23—23 and 24—24 of relatively spaced sprocket wheels. The inner sprocket wheels 23 at the delivery end of the carrier are both fixed on a common hub 25 which is keyed on a shaft 26 rotatably journaled between supporting members in the form of side plates 27. Members 27 are mounted in spaced parallel relation on the cover 19 of the feed platform or table and may be interconnected and braced against relative deflection by suitable webbing 28, 29, extending therebetween as in Fig. 1.

A dead shaft 30 supported between the members 27 in laterally outwardly spaced relation from the bale casing carries a sleeve 31 on which is journaled a hub 32 which supports the outer sprockets 24. In order to permit adjustment of the chains 21 to take up slack therein, the shaft 30 is supported in horizontal slots 33—33 in the respective side plates 27—27. Adjustment of the shaft 30 in said slots may be produced by mechanism such as illustrated in Fig. 11 wherein diametrical bores through the ends of the shaft 30 slidably receive bolts 34 which are fixed to brackets 35 exteriorly of the side plates 27, and nuts 36 threaded on said bolts may be rotated as desired to obtain the necessary adjustment of the shaft 30 along the slots 33.

It is essential to the present invention that the endless carrier 21—21 be driven continuously in the same direction in timed relation to the reciprocation of the bale plunger 5. To this end the endless carrier of the preferred embodiment is driven from a sprocket 37 on the plunger crank shaft 6 by means of a chain 38 passed around a sprocket 39 fixed on a driven counter-shaft 40 which is rotatably supported by gear box 41 and bracket 42 on the side plate 27. A bevel gear 43 keyed on the shaft 40 within gear box 41 meshes with a similar bevel gear 44 keyed on the shaft 26 and thus transmits rotation to the hub 25 and sprockets 23. Conventional tying or binding mechanism on the baler (not shown) may be actuated by a usual one revolution clutch, the constantly rotating member 45 of which is driven by a chain drive 46 extending through the side plates 27 from the counter shaft 40. A usual metering wheel 47 acts through a trip rod 47a to actuate the clutch and tying mechanism in usual manner each time the bale reaches a predetermined length.

The length of each endless chain 21 will, of course, be a multiple of the circumference of its drive sprocket 23 so that feed finger or member 20 carried at a given point on the endless carrier comprising said chains will always enter the bale casing 2 at the same position relative to the stroke of the bale plunger. These points or locations will be so selected, that each finger 20 will enter the bale chamber to move hay thereinto while the plunger is retracted, and will be withdrawn from the bale chamber in ample time to avoid damage by the plunger on its next succeeding compression stroke. While the endless carrier may function successfully with but a single feed finger or set of fingers at but one location lengthwise thereof, it is a highly important feature of the invention to provide feed fingers in at least two locations along the carrier positioned so that while one set of fingers is moving material into the bale chamber another set of fingers will have commenced to move a fresh charge of material toward the feed opening 3. Thus one of the sets of fingers will be operative at all times to deliver hay toward the bale chamber while the other set of fingers is making its return movement with the upper or return run of the carrier 21—21.

In the illustrated embodiment, it will be seen that the respective pairs of sprockets 23—24 are located in horizontal alignment so that the lower runs of the chains 21 move parallel to the surface of the feed table to carry the feed fingers 20 in sweeping relation thereover toward the bale casing. Moreover the sprockets 23—23 at the delivery end of the carrier are located above the bale casing so that after the fingers 20 have entered the bale chamber 2 through the feed opening 3 and while they are still moving across said chamber, the movement of the chains 21 upwardly around the sprockets 23 serves to withdraw the fingers 20 upwardly through the slots 22 in the top of the bale chamber. The sprockets 23—24 merely exemplify one suitable means for guiding the endless carrier 21—21 in a circuit, the operative portion of which extends horizontally over the feed table 13 to a location over the bale chamber 2 and thence upwardly to carry the feed fingers into and out of the bale chamber in timed relation to the plunger movement, and the return portion of which is along a different route than the operative portion so that the feed fingers 20 may be spaced at fixed intervals along said circuit. With such arrangement one or more feed fingers or sets thereof may be moving through the operative portion of said circuit at all times to maintain a continuous flow of hay across the feed table.

It is the function of the feed fingers 20 not only to move hay into the bale chamber but to distribute it thereacross so that the completed bales will be properly filled out. This requires particularly that hay be delivered into the upper corner of the bale chamber remote from the feed opening or in other words the upper right hand corner as viewed in Fig. 1, and that it be compressed somewhat against the remote vertical wall 2' of the chamber. For this reason it is desirable to positively maintain the fingers 20 in near perpendicular positions substantially parallel to the wall 2' during at least the first part of their movement into the bale chamber to exert an efficient compressing action against said wall. Perpendicular positioning of the fingers also permits a sufficiently endwise withdrawal of fingers to prevent them from carrying hay upwardly through the slots 22.

Each feed finger 20 in the preferred embodiment is pivotally supported at its base on a pin 48 extending transversely across and carried by the respective chains 21, the feed fingers being arranged preferably in pairs or sets on the opposite ends of said pins. The sprockets 23 and 24 are accordingly provided with notches 23', 24', to accommodate these pins. A control arm 49 rigid with each finger and projecting transversely thereto from the vicinity of its pivot 48 carries means such as the roller 50 for movement along suitable guide rails on the adjacent side plate 27 which govern the angular position of the finger about its pivot 48. The guide rails and their mode of assembly on the respective side plates is best shown in Fig. 1 and in dissembled or exploded relation in Figs. 4 to 8, inclusive.

The inner guide rail plate 27 consisting of the two relatively adjustable U sections 51 and 52 has its lower portion 51a extending horizontally to maintain the feed fingers 20 in vertical position as they sweep hay across the feed table toward the infeed opening 3.

At the discharge end of the carrier, the closed end 51b of the U section 51 extends eccentrically around and progressively approaches the rotational axis 26 of the sprockets 23 to permit progressive rearward swinging or yielding of the fingers while positively maintaining them in a near vertical position as they are rotated upwardly around the sprockets during their withdrawal from the bale casing.

Inasmuch as each rail 51 positively limits the rear swinging movement of its associated fingers to maintain them in near vertical position during their passage through the bale chamber, this will permit them to effectively compress hay against the far side 2' of the bale casing.

After the rail 51 on each side plate 27 has passed around the axis of sprockets 26 it preferably slopes upwardly as at 51c in a generally tangential direction to the sprockets 24 to gradually erect the fingers 20 on their return movement and then merges with a tangential portion of the rail 52 which then extends concentrically around the axis of sprockets 24 to maintain the fingers 20 in erected position as they move therearound to travel the operative portion of their circuit.

Since centrifugal force may urge the fingers to assume radial positions as they are retracted around the sprockets 23, it may be desirable, though by no means essential, to provide a retaining rail 53 parallel to the rail 51 to pull the rollers into the desired path of travel.

In order to prevent deflection of the feed finger pivots 48 from the desired path of movement, under the influence of various forces acting on such fingers during their operation, it is desirable to have rollers 54 on the outer ends of said pivot pins 48 movable along suitable guide rails. By reference to Fig. 9 it will be seen that such rollers 54 are supported in laterally offset positions from the rollers 50 so as not to cooperate with the relatively narrow rail portions 51b, 51c and 53 which guide the control arm roller 50 during and after withdrawal of the feed fingers from the bale chamber.

However, said rollers 54 are in constant engagement with rails carried by respective side plates 27, each such rail comprising the relatively adjustable sections 55 and 56, both of which project laterally beyond the rail portions 51b, 51c and 53 for engagement by the rollers 54. If desired, the lower portion or section 51a of each inner rail 51 may be of an increased width corresponding to that of the rail sections 55 and 56 to cooperate with both the rollers 50 and 54 during the operative portion of the circuit traveled by the respective fingers 20.

In order to permit adjustment of the sprockets 24 without destroying the relationship between these and the rail sections 52 and 56, it is desirable to fixedly interconnect such sprockets and rails for adjustment as a unit. The preferred mode of accomplishing this is shown in Figs. 1, 10 and 11 in which it will be seen that the track sections 52 are interconnected by sleeve 31 which receive and are adjustable with the dead axle 30 which supports the sprockets 24—24. Angular displacement of these track sections 52 around the shaft 30 is prevented by slidable connections 57 between each track section and its side plate 27.

As is best shown in Fig. 10, each track section 56 is connected to its associated track section 52 for adjustment therewith by means of a link 58 extending exteriorly of the side of its associated side plates 27, and bolted to the respective track sections 52 and 56 through longitudinal slots 59 in the side plates.

In order to avoid breakage of the feed fingers 20 in the event the feed fingers encounter foreign objects or excessive accumulations of hay, it is desirable to so construct these fingers that they may resiliently yield. This I accomplish as shown in Fig. 12 by pivotally connecting each feed finger 20 to its respective control arm 49 as at 60, and by connecting a toggle linkage 61—62 diagonally between the free end of the finger 20 and arm 49, respectively, resilient means in the form of a leaf spring 63 normally exerting pressure between the finger 20 and toggle linkage to urge the latter to a position wherein its respective links 61—62 are in near alignment to normally maintain the finger 20 erect. Limit means in the form of a hook or abutment 64 carried by the control arm 49 prevents the toggle links from quite reaching an aligned or dead center position in which they would tend to lock the feed finger against yielding movement.

With such an arrangement the toggle linkage 61—62 will normally retain its feed finger or member 20 erect while the latter exerts a very substantial pressure against the hay. However, in the event a foreign object is encountered, the impact of the feed finger 20 thereagainst will serve to break or collapse the toggle linkage 61—62. Once such linkage is collapsed, its resistance to yielding of the finger or member will decrease as such yielding progresses. This will facilitate the action of the finger in riding over foreign objects without damage and will lessen the likelihood that such foreign objects will be carried into the bale chamber where they might damage the operating parts of the baler.

It will be noted that the fingers 20 are free to yield as above described at any point in their operative movement and independently of the action of the control arms 49 and their cooperating guide rails.

Reliability of operation of the feed fingers 20 may be increased by the novel disposition of stops or projections 65—65 on each of the sprockets 23 for cooperation therewith. The stops 65 (Fig. 1) are fixed on and project axially from the respective sprockets 23 in positions to abut against the rollers 50 of the respective control arms and thereby prevent such control arms from yielding beyond the dead center position as the fingers are withdrawn upwardly from the bale chamber 2.

Also, stops 66 (Fig. 1) may be disposed at suitable locations on the chains 21 to limit the yielding movement of the respective fingers 20 within the desired range.

In the operation of the invention, as the baler moves along a windrow of hay the pick-up mechanism delivers such hay onto the table or platform 13. The feed fingers 20 sweeping across the table 13 carry the hay transversely to the bale chamber 2 and through the side feed opening 3 thereof (the plunger then being retracted), then pack it against the far wall 2' of said chamber and as an incident to their upward withdrawal through the slots 22 carry hay up into the far upper corner of said chamber remote from the feed opening.

During at least part of their movement through the bale chamber the fingers 20 are positively maintained in a near vertical position whereby they may effectively compact the hay against the far side 2' of the bale chamber and yet may efficiently clear themselves of hay by virtue of their near endwise upward withdrawal through the slots 22 in the top of the bale casing.

As one set of fingers is withdrawn from the bale chamber and commences the return portion of its movement, the plunger 5 moves past the feed opening 3 on its compression stroke to compress the wad of hay just delivered against the previously compressed hay within the bale chamber. At this time (and simultaneously with the return movement of the first set of fingers) a second set of fingers 20 is sweeping hay across the feed table 13 and precompressing it against the side of the bale plunger 5 which then covers the feed opening. Before this set of fingers 20 reaches the feed opening 3 the plunger 5 is withdrawn beyond the feed opening on its retraction stroke whereupon the fingers move the hay through the opening into the bale chamber 2, and themselves enter the bale chamber through the feed opening to compact the hay against the far wall 2' of the chamber as above mentioned. The said second set of fingers is then withdrawn upwardly through the slots 22 while the plunger is still retracted, while the first set of fingers above mentioned commences its operative sweep across the table 13.

The entire operation is, of course, continuously repeated.

In the event the fingers 20 encounter unyielding objects or obstructions, the collapsing action of their respective toggle linkages 61—62 will permit them to yield and ride over such objects or obstructions without damage, independently of the action of the control arms 49 and the rails aforementioned.

Should it become necessary to take up slack in the chains 31, this may be done by loosening the several nuts and bolts which slidably mount the two track sections 52 and 56 on each side plate 27. Then by adjusting the nuts 36 and moving the dead shaft 30 along its slots 33, the rail sections 52 and 56 connected for movement with said shaft may be caused to move with the shaft 30 and sprockets 24 without disrupting the relative positions of said sprockets and rail sections.

While this invention has been described in connection with a particular embodiment thereof, it will be understood that it is capable of further modification and other uses, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described my invention what I claim is:

1. In a hay baler having a bale chamber provided with an opening in a vertical side wall thereof, a plunger reciprocable in said chamber and past said opening, a feed table extending laterally from said opening, feeding means extending substantially in the same direction as the direction of extent of said feed table, said feeding means including one feed finger at least, and means for driving said feeding means whereby on a working stroke said feed finger sweeps across said feed table, through said opening, and into said bale chamber in a constant timed relation with said plunger, the combination of control means for said feed finger for decreasing the feeding force exerted by the feed finger, said control means being operable only when a feeding resistance is encountered by the finger on a working stroke exceeding a predetermined amount.

2. A hay baler as recited in claim 1 wherein said control means comprises a toggle engaging said feed finger and normally holding said finger in a given position, said toggle breaking when the finger encounters said feeding resistance exceeding a predetermined amount, and a spring for returning said toggle to its normal holding position upon removal of the resistance on said finger.

3. A hay baler comprising a bale chamber having an opening in a vertical side wall thereof, a plunger reciprocable in said chamber and past said opening, a feed table extending laterally from said feed opening, an endless conveyor extending in the same direction as the direction of extent of said feed table, a plurality of feed fingers carried at spaced intervals on said endless conveyor, means for driving said endless conveyor so that said feed fingers sweep hay across said feed table, through said opening and into said bale chamber in timed relation to said plunger, and means for normally holding said feed fingers generally perpendicular to said conveyor on a working stroke, said holding means comprising a toggle and spring for each finger, each toggle holding its associated finger extended unless a resisting force is encountered by the finger sufficient to break the toggle whereupon the toggle collapses and the finger readily yields rearwardly relative to its direction of movement, each spring offering no material resistance to the yielding of a finger but being sufficient to move said toggle back to original position after a resisting force encountered has been removed.

References Cited in the file of this patent

UNITED STATES PATENTS

| 521,261 | Fette | June 12, 1894 |
| 825,226 | Linden | July 3, 1906 |
| 1,028,404 | Traube | June 4, 1912 |
| 2,647,355 | Luke | Aug. 4, 1953 |
| 2,773,341 | Gaubert | Dec. 11, 1956 |

FOREIGN PATENTS

| 510,164 | Belgium | Apr. 15, 1952 |
| 553,719 | Great Britain | June 2, 1943 |